(12) United States Patent
Taori et al.

(10) Patent No.: US 9,379,807 B2
(45) Date of Patent: *Jun. 28, 2016

(54) DATA TRANSMISSION SYSTEM FOR ASYNCHRONOUS TRANSMITTING DATA AND MAP INFORMATION

(75) Inventors: Rakesh Taori, Suwon-si (KR); Ki-Sun Oh, Gunpo-si (KR); Hyun Jeong Kang, Seoul (KR); Mi-Sun Do, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 1470 days.

This patent is subject to a terminal disclaimer.

(21) Appl. No.: 12/034,751

(22) Filed: Feb. 21, 2008

(65) Prior Publication Data

US 2009/0011705 A1    Jan. 8, 2009

Related U.S. Application Data

(60) Provisional application No. 60/948,091, filed on Jul. 5, 2007.

(30) Foreign Application Priority Data

Nov. 1, 2007   (KR) .................. 10-2007-0111197

(51) Int. Cl.
*H04B 3/36* (2006.01)
*H04B 7/14* (2006.01)
(Continued)

(52) U.S. Cl.
CPC .............. *H04B 7/2606* (2013.01); *H04B 7/155* (2013.01)

(58) Field of Classification Search
CPC .... H04B 7/026; H04B 7/0619; H04B 7/0671; H04B 7/0673; H04B 7/15528; H04B 7/15542; H04B 7/15557; H04B 7/15592; H04B 7/2606; H04B 7/2656; H04B 7/155; H04B 7/2615; H04W 84/047; H04W 72/0406; H04W 52/46; H04W 56/00; H04W 68/00; H04W 40/22; H04W 84/18; H04W 88/04; H04L 2001/0097; H04L 1/0041; H04L 1/0045; H04L 1/0618; H04L 5/00; H04L 27/2602; H04L 27/2608; H04L 47/28; H04L 47/283; G06F 13/4009; H04H 20/02; H04H 20/38; H04H 60/40; H04N 21/26241; H04N 21/4305

USPC .......... 455/7–13.1, 14–15, 18, 21–24, 68, 69, 455/126; 370/75, 97, 226, 227, 228, 370/242–243, 246–248, 274, 279, 280, 293, 370/315–316, 324–326, 478, 491, 492, 370/501; 375/211, 232, 233

See application file for complete search history.

(56) References Cited

U.S. PATENT DOCUMENTS 6,342,777 B1   1/2002   Takahashi
7,746,822 B2 * 6/2010   Xue ..................... H04B 7/2606
                                                        370/328

(Continued)

FOREIGN PATENT DOCUMENTS

KR         2007-38651         4/2007

OTHER PUBLICATIONS

International Search Report and Written Opinion issued in corresponding International Patent Application No. PCT/KR2008/001338 dated Jun. 24, 2008.

(Continued)

*Primary Examiner* — Yuwen Pan
*Assistant Examiner* — Paul P Tran
(74) *Attorney, Agent, or Firm* — NSIP Law (57) ABSTRACT

A relay including a receiver to receive from a base station, data, a first data frame, and a second data frame, the first data frame includes data and data transmission time information associated with the data, and the second data frame includes map information corresponding to the data and map information transmission time information associated with the map information; a data frame computation unit to compute a third data frame and a fourth data frame, wherein the third data frame is used to transmit the data to a terminal and the fourth data frame is used to transmit the map information to the terminal; and a transmitter to transmit the data to the terminal using the map information when the third data frame is the same as the fourth data frame.

19 Claims, 6 Drawing Sheets

(51) Int. Cl.

| | | |
|---|---|---|
| *H04B 1/60* | (2006.01) | |
| *H04B 17/02* | (2006.01) | |
| *H04B 7/15* | (2006.01) | |
| *H04B 7/185* | (2006.01) | |
| *H04J 1/10* | (2006.01) | |
| *H04J 3/08* | (2006.01) | |
| *H04W 4/00* | (2009.01) | |
| *H03H 7/30* | (2006.01) | |
| *H03H 7/40* | (2006.01) | |
| *H03K 5/159* | (2006.01) | |
| *G08C 25/02* | (2006.01) | |
| *H04L 1/18* | (2006.01) | |
| *H04N 7/173* | (2011.01) | |
| *H04B 7/26* | (2006.01) | |
| *H04B 7/155* | (2006.01) | |

(56) References Cited

U.S. PATENT DOCUMENTS

| | | | |
|---|---|---|---|
| 7,877,057 B2 * | 1/2011 | Izumikawa et al. | 455/7 |
| 7,992,174 B2 * | 8/2011 | Gin et al. | 725/63 |
| 8,218,470 B2 * | 7/2012 | Taori | H04B 7/155 370/315 |
| 8,774,019 B2 * | 7/2014 | Ma et al. | 370/252 |
| 2006/0046643 A1 | 3/2006 | Izumikawa et al. | |
| 2006/0239264 A1 * | 10/2006 | Kang et al. | 370/390 |
| 2007/0058577 A1 | 3/2007 | Rubin | |
| 2007/0097905 A1 | 5/2007 | Suh et al. | |
| 2007/0110016 A1 * | 5/2007 | Shen | H04B 7/15542 370/338 |
| 2008/0045145 A1 * | 2/2008 | Nakatsugawa | 455/11.1 |
| 2008/0045148 A1 * | 2/2008 | Okuda | 455/18 |
| 2008/0151802 A1 * | 6/2008 | Sheu et al. | 370/311 |
| 2008/0175221 A1 * | 7/2008 | Nakahara | H04B 7/022 370/350 |
| 2009/0011702 A1 * | 1/2009 | Horiuchi | H04B 7/15592 455/9 |
| 2009/0201900 A1 * | 8/2009 | Suga | H04B 7/155 370/338 |
| 2010/0182946 A1 * | 7/2010 | Ni | H04B 7/15592 370/315 |

OTHER PUBLICATIONS

Chinese Office Action issued Oct. 31, 2012 in counterpart Patent Application No. 200880105377.6 (6 pages, in Chinese).

European Search Report issued Mar. 18, 2014 in counterpart European Patent Application No. EP 08 72 3375 (8 pages).

* cited by examiner

DATA TRANSMISSION SYSTEM FOR ASYNCHRONOUS TRANSMITTING DATA AND MAP INFORMATION

CROSS-REFERENCE TO RELATED APPLICATIONS

This application claims the benefit of a U.S. Provisional Application No. 60/948,091, filed in the U.S. Patent and Trademark Office on Jul. 5, 2007, and of Korean Patent Application No. 2007-111197, filed in the Korean Intellectual Property Office on Nov. 1, 2007, the disclosures of which are incorporated herein by reference.

BACKGROUND OF THE INVENTION

1. Field of the Invention

Aspects of the present invention relate to a wireless communication system that can transmit data from a base station to a terminal, and more particularly, to a relay system that can transmit data via a relay.

2. Description of the Related Art

There are increasing demands to use voice communication, video communication, data communication, and the like with a wireless communication network. The bandwidth for transmission of data to be transmitted between a base station and a terminal via a radio link is determined based on the state of the radio link. The state of the radio link is unstable due to fading and other factors. When the bandwidth for data transmitted to the terminal accessed to the base station increases, the number of terminals with which one base station can simultaneously communicate may be reduced. The coverage of each base station may also be reduced.

SUMMARY OF THE INVENTION

Aspects of the present invention provide a relay system that can transmit data from a base station to a terminal via a relay. The relay system can directly transmit data from the base station to the terminal and also can transmit data from the base station to the terminal via the relay, depending on a data transmission mode. The relay system can select a radio link with a better channel state from radio links from the base station to the terminal and other radio links from the relay to the terminal, and transmit data using the selected radio link. Therefore, data transmission efficiency can be improved.

Additional aspects of the present invention provide a relay system that can allocate radio resource to a radio link from the relay to a terminal and transmit data using the allocated radio resource. When transmitting in advance to the terminal map information that includes information about the allocated radio resource, the terminal can receive the data using the map information.

Further aspects of the present invention provide a base station that can transmit to a relay data and map information corresponding to the data, using the same data frame. The data and the map information can be synchronously transmitted, and thus can be easily bound. The relay includes the data in a subsequent data frame followed by the data frame received from the base station, and thereby transmits the data and the map information to the terminal.

According to an aspect of the present invention, a relay is provided. The relay includes a receiver to receive from a base station data, a first data frame, and a second data frame, the first data frame including data and data transmission time information associated with the data, and the second data frame including map information corresponding to the data and map information transmission time information associated with the map information; a data frame computation unit to compute a third data frame and a fourth data frame, wherein the third data frame is used to transmit the data to a terminal and the fourth data frame is used to transmit the map information to the terminal; and a transmitter to transmit the data to the terminal using the map information when the third data frame is the same as the fourth data frame.

According to another aspect of the present invention, a base station apparatus is provided. The base station apparatus includes a radio resource allocation unit to allocate a radio resource to a radio link between a relay and a terminal; and a transmitter to transmit to the relay a first data frame and a second data frame, the first data frame including data and data transmission time information associated with the data, and the second data frame including map information corresponding to the data and map information transmission time information associated with the map information; wherein the data is included in a third data frame corresponding to the data transmission time information based on the map information, and is transmitted from the relay to the terminal.

According to still another aspect of the present invention, a method of forwarding data is provided. The method includes receiving from a base station apparatus a first data frame including data and data transmission time information associated with the data; receiving from the base station apparatus second data frame including map information corresponding to the data and map information transmission time information associated with the map information; computing a third data frame to transmit the data to a terminal; computing a fourth data frame to transmit the map information to the terminal; and transmitting the data to the terminal using the map information when the third data frame is the same as the fourth data frame.

Additional aspects and/or advantages of the invention will be set forth in part in the description which follows and, in part, will be obvious from the description, or may be learned by practice of the invention.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 1:
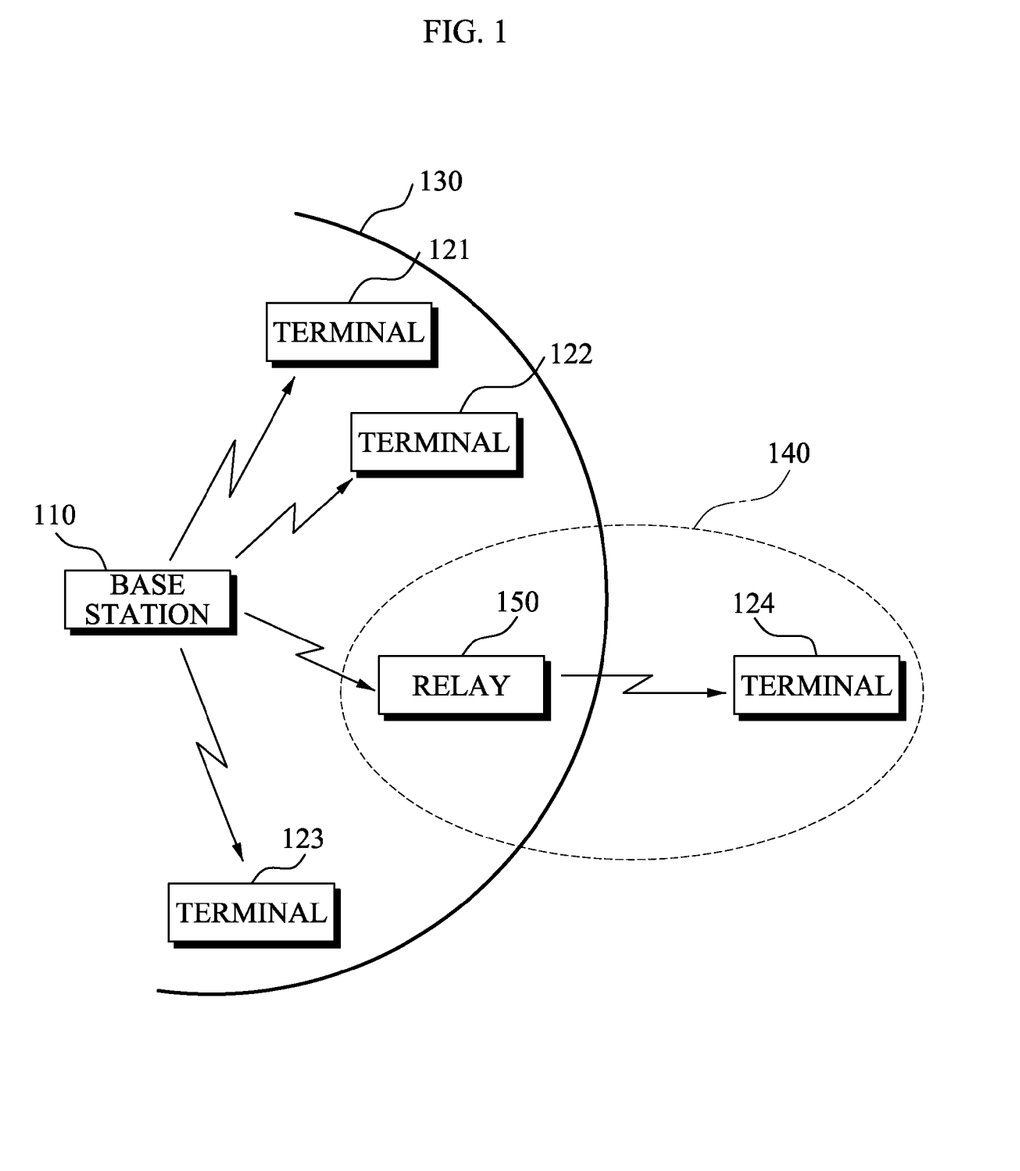
FIG. 1 illustrates a relay system for transmitting data to a terminal via a relay according to an embodiment of the present invention.

FIG. 1 shows a relay system for transmitting data to a terminal via a relay according to an aspect of the present invention. A base station 110 transmits data to terminals 121, 122, and 123 that are located within a coverage area 130 of the base station 110. A terminal 124 is located outside the coverage area 130. When the terminal 124 is located within a coverage area 140 of a relay 150 associated with the base station 110, the base station 110 may transmit the data to the terminal 124 via the relay 150. According to an aspect of the present invention, even though the terminals 121, 122, and 123 are located within the coverage area 130 of the base station 110 and thus may directly receive data from the base station 110, the terminals 121, 122, and 123 may transmit the data from the base station 110 via the relay 150 in order to improve the performance of the entire relay system.

The base station 110 and the terminals 121, 122, 123, and 124 are used herein for convenience of description. The term 'base station' denotes an apparatus that can transmit user data, and the term 'terminal' denotes an apparatus that can receive the user data. Accordingly, aspects of the present invention may be applicable to a downlink and an uplink of a mobile communication system. The mobile communication system may communicate using any wireless technology, such as WiMAX, WiBro, Wi-Fi, or cellular technology. Similarly, the terminals 121, 122, 123, and 124 may be any device capable of communicating wirelessly, including non-portable devices, such as desktop PCs, set-top boxes, and home entertainment devices; and portable devices, such as laptop computers, personal digital assistants (PDAs), mobile phones, and personal entertainment devices.

The base station 110 may transmit map information to the terminals 121, 122, 123, and 124. The terminals 121, 122, 123, and 124 may receive data based on the map information. The map information includes information about a time to transmit the data.

The base station 110 transmits the data to the terminal 124 via the relay 150. The relay 150 forwards to the terminal 124 data and map information corresponding to the data. The map information may not be needed when the relay 150 receives the data. However, when the relay 150 receives a plurality of data or a plurality of map information, the relay 150 should determine which data corresponds to which map information, which may be referred to as 'binding'. The relay 150 may bind corresponding data and map information based on information about the time to transmit the data from the relay 150 to the terminal 124 and information about a time to transmit the map information from the relay 150 to the terminal 124.

When data and map information corresponding to the data are transmitted with a predetermined temporal relevance, it can be said that the data and the map information are synchronously transmitted. For example, when the base station 110 separates the entire data transmission time into predetermined time periods and transmits data during each time period, data and map information corresponding to the data may be transmitted during the same time period. In this case, it can be said that the data and the map information corresponding to the data are synchronously transmitted. Conversely, when the data and the map information corresponding to the data are transmitted during different time periods, it can be said that the data and the map information corresponding to the data are asynchronously transmitted.

According to an aspect of the present invention, when the relay 150 separates the entire data transmission time into a plurality of time periods having a predetermined length and transmits data during each time period, the relay 150 may determine that data and map information that are transmitted from the relay 150 to the terminal 124 during the same time duration correspond to each other, and bind the data and the map information.

When the base station 110 transmits data to the terminal 124 directly, the terminal 124 receives the data using map information that is received from the base station 110. Therefore, the data and the map information corresponding to the data may be synchronously transmitted.

When the base station 110 transmits data to the terminal 124 via the relay 150, the base station 110 transmits to the terminal 124 map information corresponding to the data via the relay 150, in addition to the data. The relay 150 does not receive the data using the map information and thus may receive the data and the map information synchronously or asynchronously. The relay 150 may bind the data and the map information, and synchronously transmit to the terminal 124 the data and the map information corresponding to the data.

According to an aspect of the present invention, the base station 110, the relay 150, and the terminals 121, 122, 123, and 124 may transmit the data using a Media Access Control (MAC) data frame of a MAC layer. In this case, 'the predetermined time period' may be interpreted as the time that is needed to transmit each MAC data frame. The map information may include a point in time when the MAC data frame starts, a point in time when transmission of data corresponding to the map information starts, or a time period when the data corresponding to the map information is transmitted.

The data transmitted from the base station 110 to the terminal 124 may be included in a burst of the MAC data frame and may be transmitted. Hereinafter, it is assumed that the base station 110, the terminals 121, 122, 123, and 124, and the relay 150 according to an aspect of the present invention transmit data using MAC data frames. Transmitting data using MAC data frames will be referred to as "transmit data or map information using data frames". According to other aspects of the present invention, the data may be transmitted in another fashion.

The relay 150 receives data from the base station 110 using a first data frame, and transmits the data to the terminal 124 using a third data frame. The relay 150 receives from the base station 110 map information about a radio link between the terminal 124 and the relay 150 using a second data frame. The relay 150 transmits the map information to the terminal 124 using a fourth data frame.

The map information includes information about a radio resource to transmit data in a data frame. The map information need not specify the data frame that transmits data from the relay 150 to the terminal 124.

The third data frame where data is transmitted from the relay 150 to the terminal 124 may be determined based on data transmission time information associated with the data. The fourth data frame where map information is transmitted from the relay 150 to the terminal 124 may be determined based on map information transmission time information associated with the map information. According to an aspect of the present invention, the data transmission time information and the map information transmission time information may include complete or a portion of frame numbers of the third data frame and the fourth data frame. According to another aspect of the present invention, the data transmission time information may include a number of data frames to be transmitted to the terminal 124 between a point in time when the relay 150 receives the first data frame and a point in time when the relay 150 transmits the third data frame. The map information transmission time information may include a number of data frames to be transmitted to the terminal 124 between a point in time when the relay 150 receives the second data frame and a point in time when the relay 150 transmits the fourth data frame.

When the map information corresponds to the data, transmission time information associated with the data and the map information may be associated with each other. The third data frame that is determined based on the data transmission time information associated with the data may be the same data frame as the fourth data frame that is determined based on the map information transmission time information associated with the map information. According to an aspect of the present invention, the relay 150 may receive a plurality of data and map information from the base station 110 using consecutive data frames. The relay 150 may bind map information corresponding to predetermined data among the plurality of map information, using map information transmission time information associated with the map information.

The relay 150 may synchronously transmit data and map information corresponding to the data to the terminal 124 using the third data frame. The map information may include a point in time when the third data frame starts, a point in time when transmission of data corresponding to the map information starts, or a time period when the data corresponding to the map information is transmitted. The terminal 124 may receive the data corresponding to the map information using the map information that is included in the third data frame.

Figure 2:
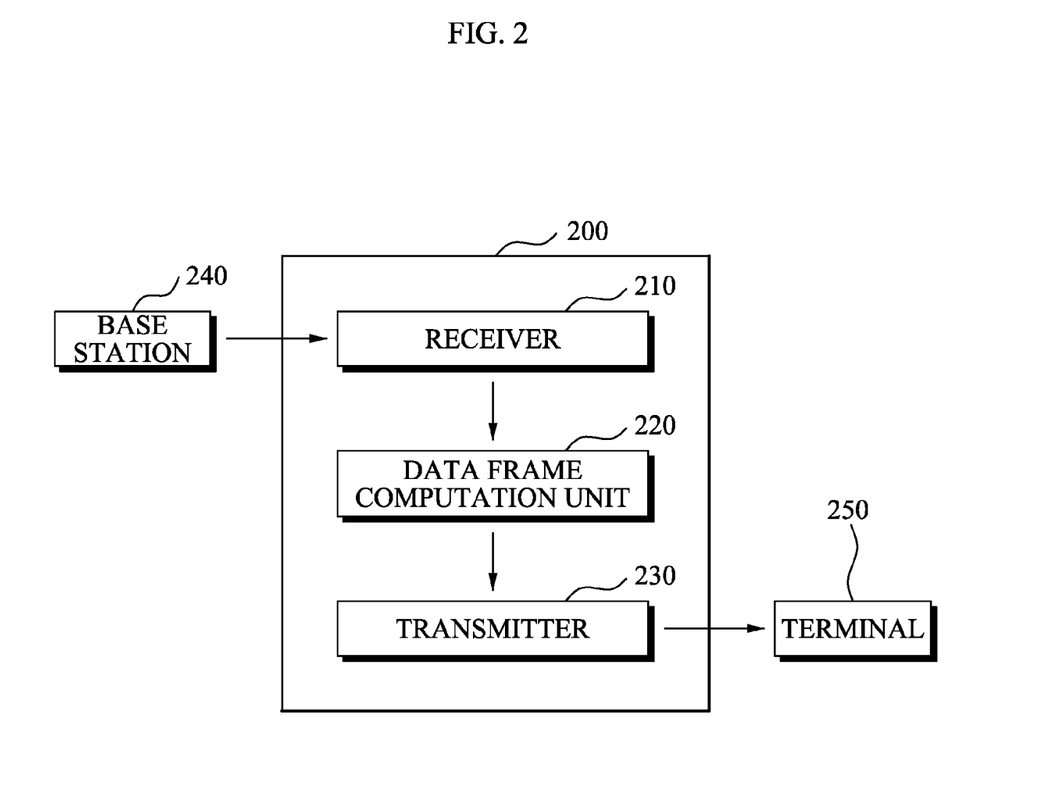
FIG. 2 is a block diagram illustrating a configuration of a relay according to an embodiment of the present invention.

FIG. 2 shows a configuration of a relay 200 according to an aspect of the present invention. The relay 200 includes a receiver 210, a data frame computation unit 220, and a transmitter 230. According to other aspects of the present invention, the relay 200 may include additional and/or different units. Similarly, the functionality of two or more of the above units may be integrated into a single component.

The receiver 210 receives from a base station 240 a first data frame that includes data and data transmission time information associated with the data. The receiver 210 receives from the base station 240 a second data frame that includes map information corresponding to the data and map information transmission time information associated with the map information. According to an aspect of the present invention, the map information may include a point in time when transmission of data corresponding to the map information starts, or a time period when the data corresponding to the map information is transmitted in a third data frame where the data is transmitted from the relay 200 to a terminal 250.

According to an aspect of the present invention, the base station 240 may transmit to the relay 200 data transmission time information that includes information about a time when data is transmitted from the relay 240 to the terminal 250. The base station 240 may transmit to the relay 200 map information transmission time information that includes information about a time when map information is transmitted from the relay 200 to the terminal 250.

The data frame computation unit 220 computes the third data frame based on the data transmission time information. The third data frame is used to transmit the data to the terminal 250. The data frame computation unit 220 computes a fourth data frame based on the map information transmission time information. The fourth data frame is used to transmit the map information to the terminal 250. The transmitter 230 transmits the data to the terminal 250 using the third data frame, and transmits the map information to the terminal 250 using the fourth data frame.

According to an aspect of the present invention, the data transmission time information may include complete or a portion of a frame number of the third data frame where the data is transmitted from the relay 200 to the terminal 250. The map information transmission time information may include a complete or a portion of a frame number of the fourth data frame where the map information is transmitted from the relay 200 to the terminal 250.

According to an aspect of the present invention, the data transmission time information may include only a predetermined length of LSB (least significant bits) of the frame number of the third data frame where data is transmitted from the relay 200 to the terminal 250. Also, the map information transmission time information may include only a predetermined length of LSB of the frame number of the fourth data frame where map information is transmitted from the relay 200 to the terminal 250. Data frames may be identified by a data frame number that is assigned to each data frame. Therefore, the data frame number should have a sufficient length to identify different data frames. According to an aspect of the present invention, the data frame number allocated to each data frame may be represented as either 32 bits or 64 bits. When the base station 240 transmits a data frame number having 64 bits as data transmission time information associated with data or map information transmission time information associated with map information, the bandwidth of a radio channel may be wasted.

There may be no great difference between a point in time when the relay 200 receives data from the base station 240 using the first data frame and a point in time when the relay 200 transmits the data to the terminal 250. The relay 200 stores in a buffer the data that is received using the first data frame during a period of time corresponding to the length of frames, based on the data transmission time information, and transmits the stored data using the third data frame. The difference between the first data frame and the third data frame is only the length of data frames. Therefore, even when transmitting a predetermined length of LSB, instead of the 64-bit data frame number, it is possible to accurately specify the third data frame.

The relay 200 stores data in the buffer until the relay 200 transmits the data using the third data frame after receiving the data using the first data frame. The data transmission time information may include a time period when the data is stored in the buffer of the relay 200.

According to an aspect of the present invention, the data transmission time information may include a number of data frames to be transmitted to the terminal 250 between a point in time when the first data frame is received and a point in time when the third data frame is transmitted. The data transmission time information may include a relative frame number difference between the first data frame and the third data frame. According to an aspect of the present invention, the map information transmission time information may include only a predetermined length of LSB of the frame number of the fourth data frame in order to save the bandwidth of a radio channel.

Figure 3:
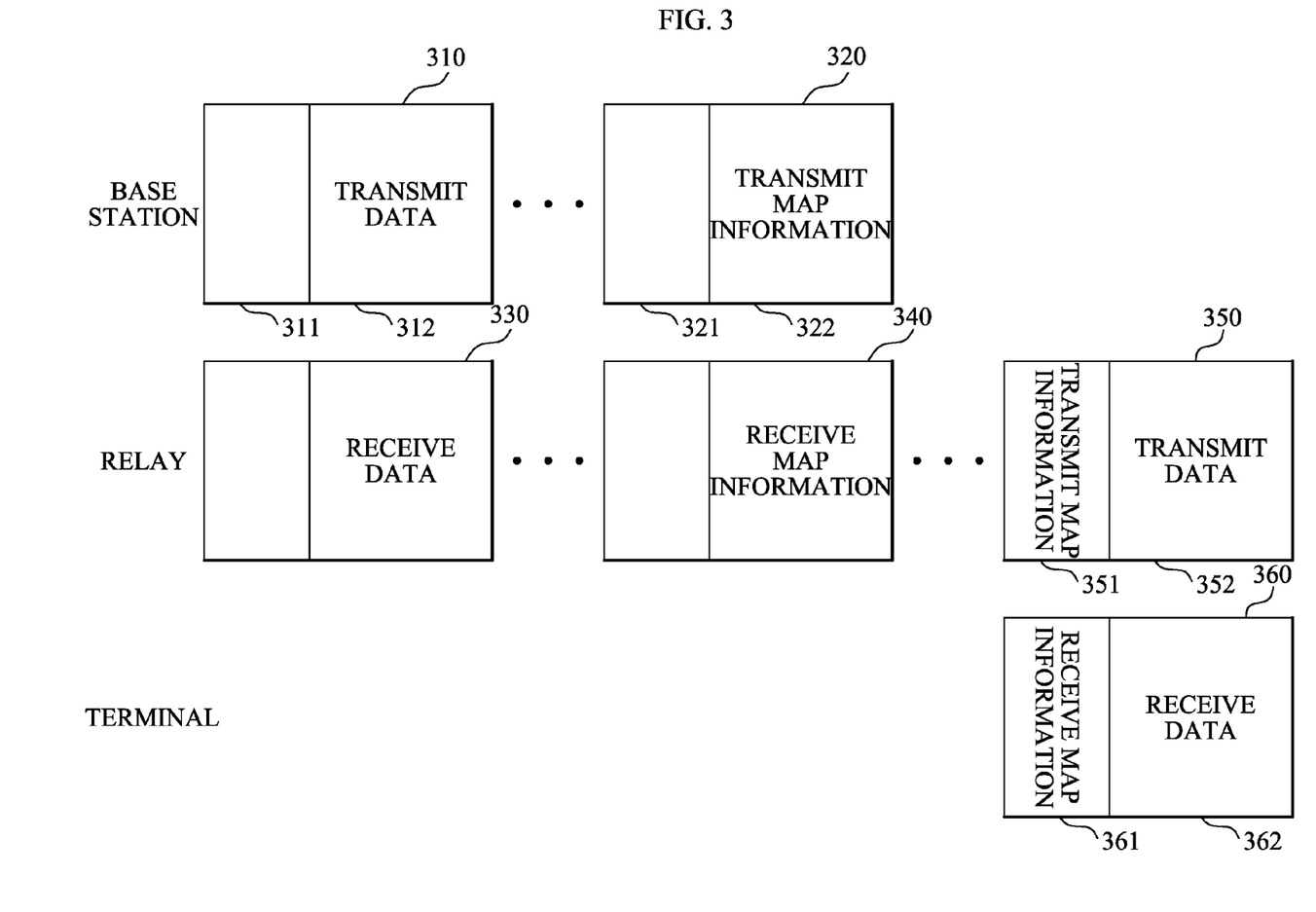
FIG. 3 illustrates an operation of transmitting data and map information to a relay using data frames according to an embodiment of the present invention.

FIG. 3 shows an operation of transmitting data and map information to a relay using data frames according to an embodiment of the present invention. A base station transmits data using a first data frame 310. The base station transmits map information using a second data frame 320. According to an aspect of the present invention, the first data frame 310 and the second data frame 320 may include control signal transmission regions 311 and 321 to transmit control signals between the base station and the relay, and data transmission regions 312 and 322 to transmit data between the base station and the relay, respectively. According to an aspect of the present invention, data and map information may be included in the data transmission regions 312 and 322, and be transmitted. The data transmission region 322 of the second data frame 320 may include a MAC protocol data unit (MPDU). The MPDU may include the map information.

The relay receives the data 330 and the map information 340. The relay may receive data transmission time information and map information transmission time information with respect to a radio link between the relay and the terminal. The relay may bind the data and the map information based on the received data transmission time information and the map information transmission time information.

The relay transmits the data and the map information to the terminal using a third data frame 350. The third data frame 350 may include a control signal transmission region 351 to transmit control signals between the relay and the terminal, and a data transmission region 352 to transmit data between the relay and the terminal.

According to an aspect of the present invention, the control signal transmission region 351 of the third data frame 350 may include a map information element (MAP IE). The map information may be transmitted to the terminal using the map information element. The data may be transmitted to the terminal using the data transmission region 352. The terminal receives map information 361 that is included in the control signal transmission region 351 of the third data frame 350. The terminal receives the data 362 using the map information.

According to an aspect of the present invention, each of the first data frame and the second data frame may include at least one of a relay MAC header, a subheader, and an extended subheader. The data transmission time information may be included in the relay MAC header, the subheader, or the extended subheader in the first data frame, and thereby be transmitted from the base station to the relay. The map information transmission time information may be included in the relay MAC header, the subheader, or the extended subheader in the second data frame, and thereby be transmitted from the base station to the relay. The data transmission time information may be included in the map information element of the first data frame and thereby received. The map information transmission time information may be included in the map information element of the second data frame and thereby received.

Figure 4A:
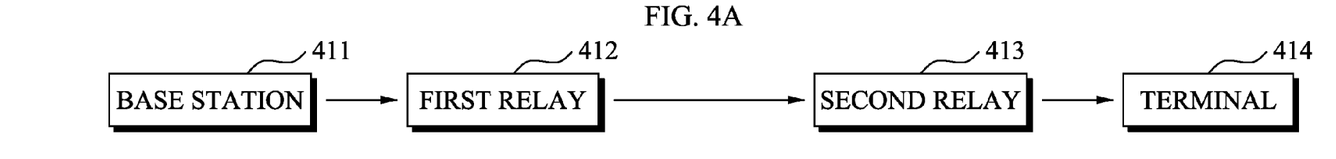
FIGS. 4A and 4B illustrate an operation of a relay system transmitting data via a plurality of relays according to an embodiment of the present invention.
Figure 4B:
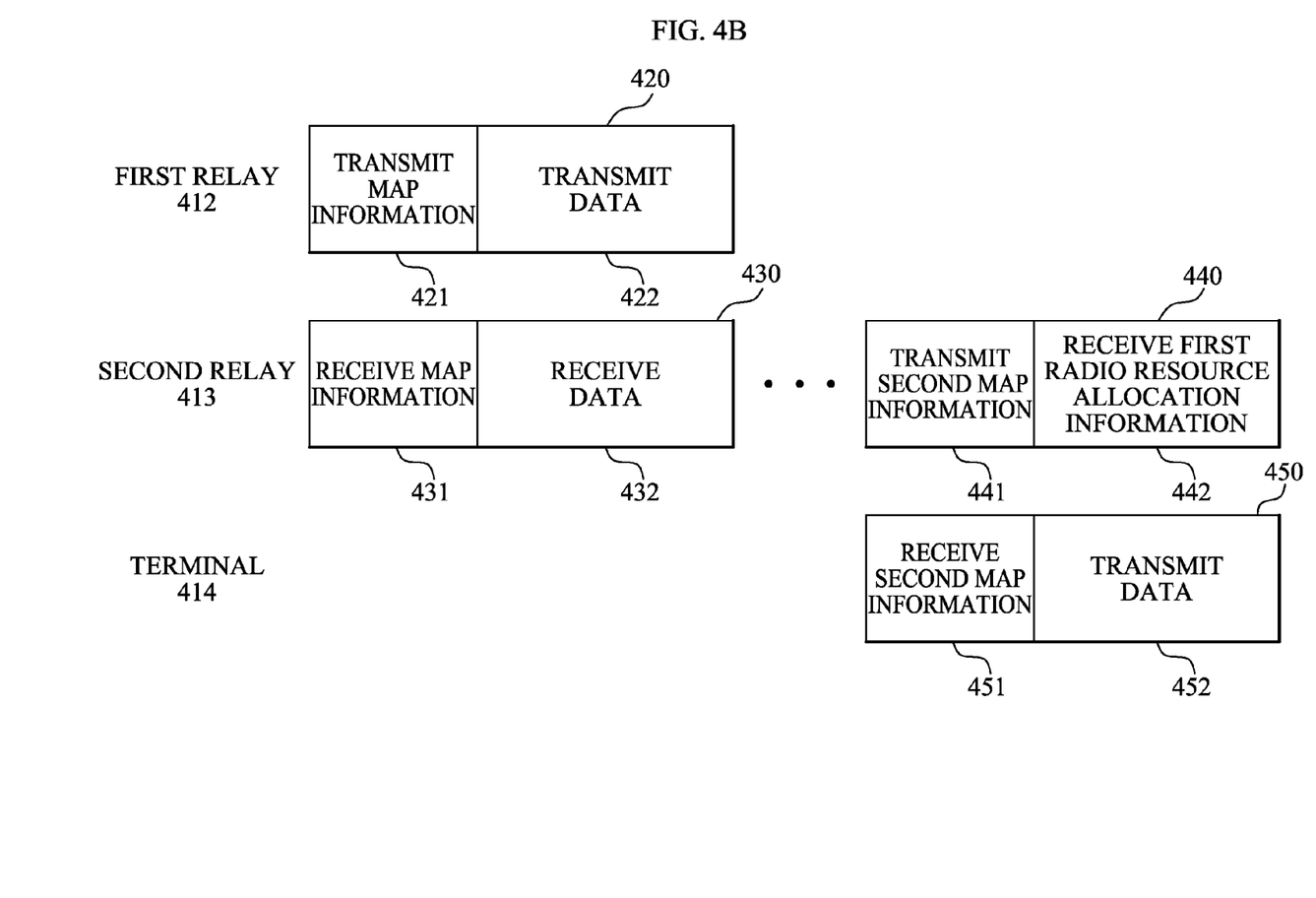

FIGS. 4A and 4B show an operation of a relay system transmitting data via a plurality of relays according to an aspect of the present invention. A base station 411 may transmit data to a first relay 412 using a first data frame and transmit map information to the first relay 412 using a second data frame. The map information includes information about a time when the data is transmitted from the first relay 412 to a second relay 413 via a radio link. The first relay 412 does not receive the data from the base station 411 using the map information and thus may asynchronously receive the data and the map information corresponding to the data. The base station 411 may transmit to the first relay 412 data transmission time information and map information transmission time information. The first relay 412 may bind the corresponding data and the map information based on the data transmission time information and the map information transmission time information.

According to an aspect of the present invention, the first relay 412 may transmit the data and the map information to the second relay 413 using a third data frame 420. The map information is included in a control signal transmission region 421 of the third data frame 420 and is transmitted. The data is included in a data transmission region 422 of the third data frame 420 and is transmitted.

The second relay 413 may receive the data from the first relay 412 using the map information. According to an aspect of the present invention, the data may include second map information. The second map information includes information about a time when the data is transmitted from the second relay 413 to a terminal 414 via a radio link. The terminal 414 receives the data from the second relay 413 using the second map information.

According to an aspect of the present invention, the second relay 413 may transmit the data and the second map information to the terminal 414 using a fifth data frame 440. The fifth data frame 440 may include the second map information in a control signal transmission region 441 and include the data in a data transmission region 442. The terminal 414 may receive the data from the second relay 413 using the second map information.

The base station 411 transmits the data and the map information to the first relay 412. The base station 411 may transmit the data to the first relay 412 using the first data frame and transmit the map information to the first relay 412 using the second data frame. The first relay 412 may receive data transmission time information and map information transmission time information about the radio link between the base station 411 and the first relay 412. The first relay 412 may bind the data and the map information based on the received data transmission time information and the map information transmission time information.

According to an aspect of the present invention, the first relay 412 transmits data and map information to the second relay 413 using the third data frame 420. The map information is included in the control signal transmission region 421 of the third data frame 420 and is transmitted. The data is included in the data transmission region 422 of the third data frame 420 and is transmitted.

The second relay 413 receives the map information 431 and receives the data 432 using the map information 431. According to an aspect of the present invention, the data 432 may include second map information. The second map information includes information about the radio link between the second relay 413 and the terminal 414. The second map information may further include second map information transmission time information associated with a transmission time of the second map information. The second relay 413 may transmit the second map information to the terminal 414 based on the second map information transmission time information.

According to another aspect of the present invention, the first relay 412 may transmit the data to the second relay 413 using the third data frame 420 and transmit the second map information to the second relay 413 using a third data frame 430. The second relay 413 does not receive the data using the second map information. Therefore, the data and the second map information corresponding to the data may be asynchronously transmitted to the second relay 413.

According to an aspect of the present invention, the second map information may be included in the control signal transmission region 441 of the fifth data frame 440 that is transmitted from the second relay 413 to the terminal 414, and be transmitted. The terminal 414 may receive the second map information 451 that is included in the fifth data frame 450, and the data 452 that is included in the data transmission region 442 of the fourth data frame 440.

According to another aspect of the present invention, the first relay 412 may transmit the data to the second relay 413 using the third data frame 420 and transmit third map information to the second relay 413 using the third data frame 430. The second relay 413 may receive the data from the first relay 412 using the second map information. The second relay 413 may bind the data and the third map information based on data transmission time information and map information transmission time information associated with the third map information. The second relay 413 may transmit the data to the terminal 414 using the third map information.

As shown in FIG. 4A, the base station 411 transmits the data to the terminal 414 via the first relay 412 and the second relay 413; however, the present invention is not limited thereto. According to another aspect of the present invention, the base station 411 may transmit data to the terminal 414 via at least three relays. In this case, data that is transmitted from each relay to a subsequent relay and map information corresponding to the data may be bound based on data transmission time information and map information transmission time information.

Figure 5:
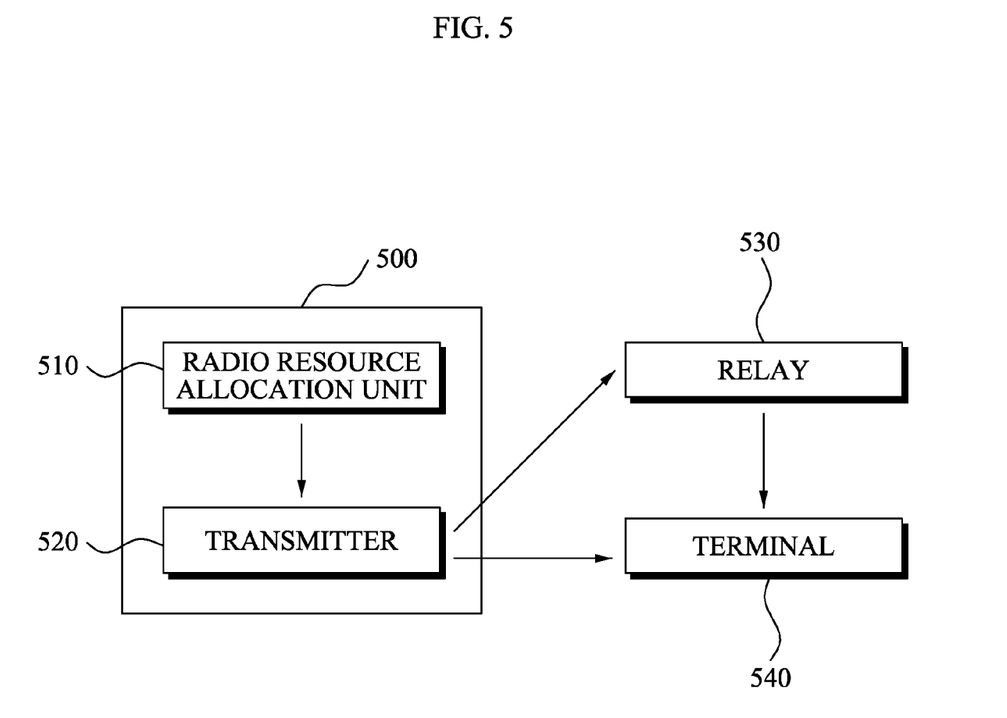
FIG. 5 is a block diagram illustrating a configuration of a base station apparatus according to an embodiment of the present invention.

FIG. 5 shows a configuration of a base station 500 according to an aspect of the present invention. The base station 500 includes a radio resource allocation unit 510 and a transmitter 520. According to other aspects of the present invention, the base station 500 may include additional and/or different units. Similarly, the functionality of two or more of the above units may be integrated into a single component.

The radio resource allocation unit 510 determines a point in time when transmission of data using a radio link between a relay 530 and a terminal 540 starts, or a time period when the data is transmitted. According to an aspect of the present invention, the radio resource allocation unit 510 may determine a time period for transmitting data, based on a state of at least one radio link that is selected from radio links connecting the base station 500, the relay 530, and the terminal 540.

The transmitter 520 transmits a first data frame to the relay 530. The first data frame includes data and data transmission time information associated with the data. The transmitter 520 transmits a second data frame to the relay 530. The second data frame includes map information corresponding to the data and map information transmission time information associated with the map information. The map information includes information about the time period where data is transmitted using the radio link between the relay 530 and the terminal 540. The relay 530 binds the received data and the map information based on the data transmission time information and the map information transmission time information. The data is included in a third data frame corresponding to the data transmission time information and is transmitted from the relay 530 to the terminal 540.

According to an aspect of the present invention, the map information may include a point in time when the third data frame starts, a point in time when transmission of data corresponding to the map information starts, or a time period when the data corresponding to the map information is transmitted. An identifier of the terminal 540 may be further included.

According to an aspect of the present invention, the first data frame or the second data frame may include a control signal transmission region to transmit control signals between the base station 500 and the relay 530, and a data transmission region to transmit data between the base station 500 and the relay 530. According to an aspect of the present invention, the data transmission region may include an MPDU. The MPDU may include map information. The map information is included in the data transmission region of the second data frame and is transmitted from the base station 500 to the relay 530.

According to an aspect of the present invention, each of the first data frame and the second data frame may include at least one of a relay MAC header, a subheader, and/or an extended subheader. The data transmission time information may be included in the relay MAC header, the subheader, or the extended subheader in the first data frame, and thereby be transmitted from the base station to the relay 530. The map information transmission time information may be included in the relay MAC header, the subheader, or the extended subheader in the second data frame, and thereby be transmitted from the base station to the relay 530.

According to an aspect of the present invention, each of the first data frame and the second data frame may include a map information element. The data transmission time information may be included in the map information element of the first data frame and be transmitted to the relay 530. The map information transmission time information may be included in the map information element of the second data frame and be transmitted to the relay 530.

Figure 6:
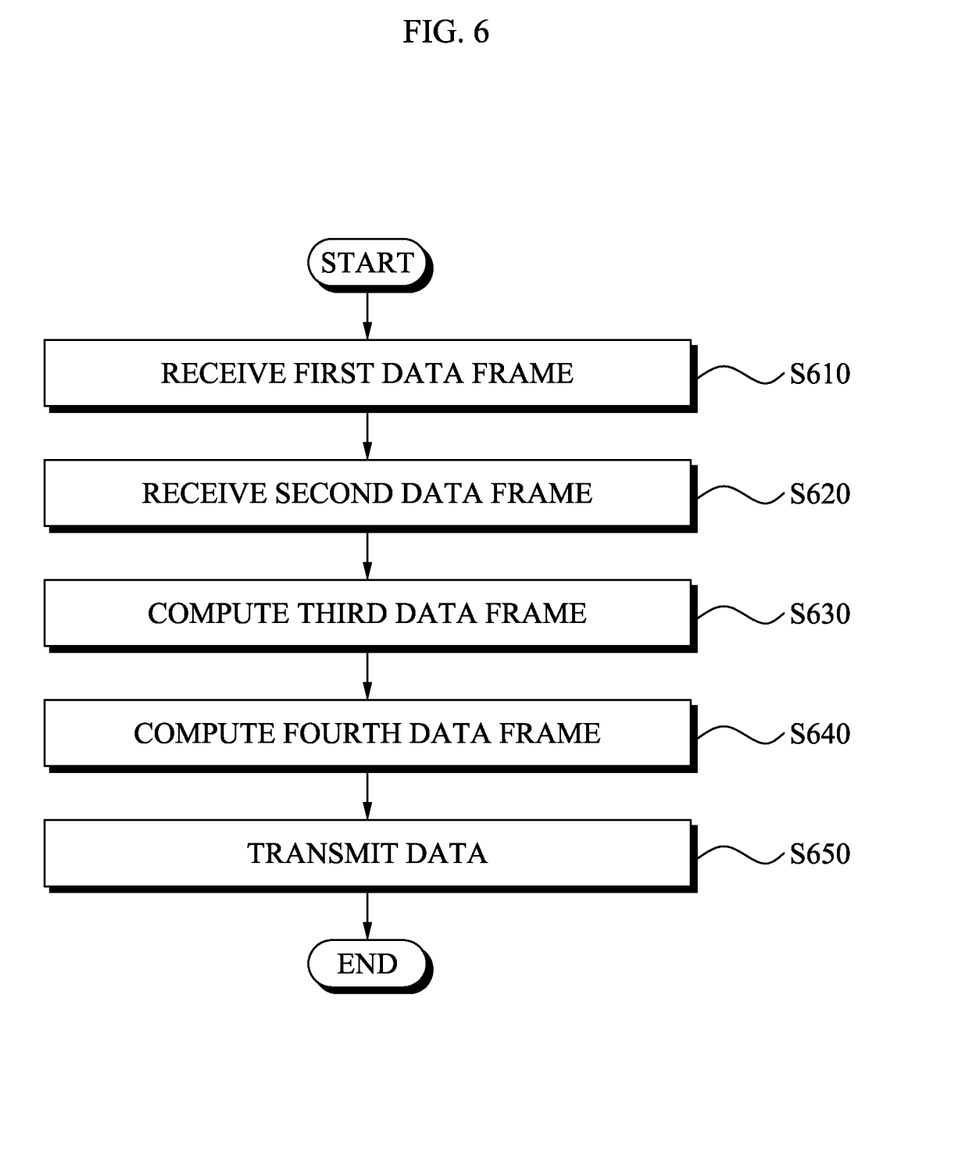
FIG. 6 is a flowchart illustrating a method of forwarding data via a relay according to an embodiment of the present invention.

FIG. 6 is a flowchart of a process of forwarding data according to an aspect of the present invention. In operation S610, a first data frame is received from a base station. The first data frame includes data and data transmission time information associated with the data.

In operation S620, a second data frame is received from the base station. The second data frame includes map information and map information transmission time associated with the map information.

In operation S630, a third data frame to transmit the data to the terminal is computed. According to an aspect of the present invention, the third data frame may be computed based on either the first data frame or the data transmission time information. The map information may include a point in time when the third data frame starts, a point in time when transmission of data corresponding to the map information starts, or a time period when the data corresponding to the map information is transmitted. The map information need not specify the third data frame to transmit the data. According to an aspect of the present invention, the map information may further include an identifier of a terminal.

Data transmission time information includes information about a time when data is transmitted from a relay to a terminal. Map information transmission time information associated with the map information includes information about a point in time when the map information is transmitted from the relay to the terminal. According to an aspect of the present invention, the third data frame may be computed based on a frame number of the first data frame or the data transmission time information. The data transmission time information may include a frame number of the third data frame. In operation S640, the fourth data frame is computed based on the second data frame or the map information transmission time information.

According to an aspect of the present invention, the data transmission time information may include only a predetermined length of LSB of the frame number of the third data frame. The map information transmission time information may also include only a predetermined length of LSB of the frame number of the fourth data frame. There may be no great difference between a point in time when the data or the map information is transmitted from the base station to the relay and a point in time when the data or the map information is transmitted from the relay to the terminal. Only the time length of some data frames may be different. Therefore, by transmitting only the predetermined length of LSB instead of the entire frame number, the relay may compute the frame number of the third data frame based on the frame number of the first data frame, or compute the frame number of the fourth data frame based on the frame number of the second data frame.

According to an aspect of the present invention, the second data frame may include a control signal transmission region to transmit control signals between the base station and the relay and a data transmission region to transmit data. The fourth data frame may include a control signal transmission region to transmit control signals between the relay and the terminal and a data transmission region to transmit data. The data transmission region of the second data frame may include an MPDU and the MPDU may include map information. The map information is included in the data transmission region of the second data frame and is transmitted from the base station to the relay. According to an aspect of the present invention, the control signal transmission region of the fourth data frame may include a map information element. The relay may transmit the map information to the terminal using the map information element.

According to an aspect of the present invention, each of the first data frame and the second data frame may include at least one of a relay MAC header, a subheader, and an extended subheader. The data transmission time information may be included in the relay MAC header, the subheader, or the extended subheader included in the first data frame, and may be transmitted from the base station to the relay. The map information transmission time information may be included in the relay MAC header, the subheader, or the extended subheader included in the second data frame, and may be transmitted from the base station to the relay.

According to an aspect of the present invention, each of the first data frame and the second data frame may include a map information element. Data transmission time information may be included in the map information element of the first data frame and be transmitted to the relay. Map information transmission time information may be included in the map information element of the second data frame and be transmitted to the relay.

In operation S650, when the third data frame is the same as the fourth data frame, the data is transmitted to the terminal using the map information. The relay may bind the data and the map information based on the data transmission time information and the map information transmission time information.

According to an aspect of the present invention, when the third data frame and the fourth data frame, which are determined based on the transmission time information, are the same data frame, it is possible to determine the data and the map information correspond to each other. Thus, binding may be performed with respect to the data and the map information. Conversely, when the data is different from the map information, the relay may transmit data to the terminal using the map information.

Aspects of the present invention can also be embodied as computer-readable codes on a computer-readable recording medium and can be realized in a common digital computer executing the program using a computer-readable recording medium. The computer-readable recording medium is any data storage device that can store data which can be thereafter read by a computer system. Examples of the computer-readable recording medium include read-only memory (ROM), random-access memory (RAM), CDs, DVDs, Blu-ray discs, magnetic tapes, floppy disks, and optical data storage devices. Aspects of the present invention may also be embodied as a computer data signal embodied in a carrier wave comprising a compression source code segment and an encryption source code segment (such as data transmission through the Internet). The computer-readable recording medium can also be distributed over network coupled computer systems so that the computer-readable code is stored and executed in a distributed fashion. Moreover, the hard disk drive can be used with a computer, can be a portable drive, and/or can be used with a media player.

Although a few embodiments of the present invention have been shown and described, it would be appreciated by those skilled in the art that changes may be made to this embodiment without departing from the principles and spirit of the invention, the scope of which is defined in the claims and their equivalents.

What is claimed is:

1. A relay comprising:
   a receiver to asynchronously receive, from a base station or an upper relay, a first data frame comprising data and data transmission time information comprising a point in time for transmitting the data, and a second data frame comprising map information corresponding to the data and map information transmission time information comprising a point in time for transmitting the map information;
   a data frame computation unit configured to:
      determine, based on the data transmission time information and the map information transmission time information, that the data and the map information are transmitted to a lower relay or a terminal during a same time duration, and
      compute a transmission data frame comprising the data and the map information by binding the data and the map information based on the determination; and
   a transmitter configured to synchronously transmit the transmission data frame to the lower relay or the terminal based on the data transmission time information.

2. The relay according to claim 1, wherein the map information comprises at least one of a time when transmission of the data starts in the transmission data frame, a time period where the data is transmitted in the transmission data frame, and an identifier of the lower relay or the terminal.

3. The relay according to claim 1, wherein the data transmission time information comprises a predetermined length of least significant bits (LSB) with respect to a frame number of the transmission data frame.

4. The relay according to claim 1, wherein the map information transmission time information comprises a predetermined length of LSB with respect to a frame number of the transmission data frame.

5. The relay according to claim 1, wherein the data transmission time information comprises a number of transmission data frames to be transmitted to the lower relay or the terminal during a time period where the data frame is received from the base station or the upper relay and thereby the transmission data frame is transmitted to the lower relay or the terminal.

6. The relay according to claim 1, wherein the map information transmission time information comprises a number of transmission data frames to be transmitted to the lower relay or the terminal during a time period where the data frame is received from the base station or the upper relay and thereby the transmission data frame is transmitted to the lower relay or the terminal.

7. The relay according to claim 1, wherein the data frame comprising the map information and the map information transmission time information comprises a Media Access Control (MAC) Protocol Data Unit (MDUP), and the map information is comprised in the MDUP.

8. The relay according to claim 1, wherein the transmission data frame comprises a map information element, and the map information is comprised in the map information element.

9. The relay according to claim 1, wherein the data transmission time information or the map information transmission time information is comprised in at least one of a relay MAC header, a subheader, and an extended subheader.

10. The relay according to claim 1, wherein the data transmission time information or the map information transmission time information is comprised in a map information element of the data frame.

11. The relay of claim 1, wherein map information is not used by the relay to receive the data included in the first data frame but is used by the terminal to receive the data included in the transmission data frame.

12. The relay of claim 1, wherein the data frame computation unit computes a third data frame and a fourth data frame, wherein the third data frame is used to transmit the data to a terminal and the fourth data frame is used to transmit the map information to the terminal and the transmitter transmits the data to the terminal using the map information when the third data frame is the same as the fourth data frame.

13. The relay of claim 1, wherein binding the data and the map information that correspond to each other is based on information about a time to transmit the data from the base station or an upper relay to the lower relay or the terminal and based on information about a time to transmit map information from the base station or an upper relay to the lower relay or the terminal.

14. A base station, comprising:
a radio resource allocation unit to allocate a radio resource to a radio link between a relay and a terminal or between an upper relay and a lower relay; and
a transmitter to asynchronously transmit, to the relay or the upper relay, a first data frame comprising data and data transmission time information comprising a point in time for transmitting the data, and a second data frame comprising map information corresponding to the data and map information transmission time information comprising a point in time for transmitting the map information,
wherein the data transmission time information and the map information transmission time information enable the relay or the upper relay to:
determine, based on the data transmission time information and the map information transmission time information, that the data and the map information are transmitted to the lower relay or the terminal during a same time duration,
compute a transmission data frame comprising the data and the map information by binding the data and the map information based on the determination, and
synchronously transmit the transmission data frame to the lower relay or the terminal based on the data transmission time information.

15. The base station according to claim 14, wherein the map information comprises at least one of a time when transmission of the data starts in the transmission data frame, a time period when the data is transmitted in the transmission data frame, and an identifier of the upper relay or the terminal.

16. The base station according to claim 14, wherein the data transmission time information comprises a predetermined length of LSB with respect to a frame number of the transmission data frame.

17. The base station according to claim 14, wherein the map information transmission time information comprises a predetermined length of LSB with respect to a frame number of the transmission data frame.

18. A method of transmitting data in a base station, the method comprising:
allocating a radio resource to a radio link between a relay and a terminal or between an upper relay and a lower relay; and
asynchronously transmitting, to the relay or the upper relay, a first data frame comprising data and data transmission time information comprising a point in time for transmitting the data, and a second data frame comprising map information corresponding to the data and map information transmission time information comprising a point in time for transmitting the map information
wherein the data transmission time information and the map information transmission time information enable the relay or the upper relay to:
determine, based on the data transmission time information and the map information transmission time information, that the data and the map information are transmitted to the lower relay or the terminal during a same time duration,
compute a transmission data frame comprising the data and the map information by binding the data and the map information based on the determination, and
synchronously transmit the transmission data frame to the lower relay or the terminal based on the data transmission time information.

19. A method of transmitting data in a relay, the method comprising:
asynchronously receiving, from a base station or an upper relay, a first data frame comprising data and data transmission time information comprising a point in time for transmitting the data, and a second data frame comprising map information corresponding to the data and map information transmission time information comprising a point in time for transmitting the map information;
determining, based on the data transmission time information and the map information transmission time information, that the data and the map information are transmitted to a lower relay or a terminal during a same time duration;
computing a transmission data frame comprising the data and the map information by binding the data and the map information based on the determination; and
synchronously transmitting the transmission data frame to the lower relay or the terminal based on the data transmission time information.

* * * * *